(12) United States Patent
Kahr et al.

(10) Patent No.: US 6,302,247 B1
(45) Date of Patent: Oct. 16, 2001

(54) BRAKE SHOE MOUNTING SYSTEM

(75) Inventors: Joseph C. Kahr; Thomas W. McCabe, both of Southern Pines, NC (US)

(73) Assignee: Westinghouse Air Brake Company, Wilmerding, PA (US)

( * ) Notice: Subject to any disclaimer, the term of this patent is extended or adjusted under 35 U.S.C. 154(b) by 0 days.

(21) Appl. No.: 09/471,533

(22) Filed: Dec. 22, 1999

(51) Int. Cl.[7] .................................................. F16D 65/04
(52) U.S. Cl. .......................... 188/248; 188/247; 188/242
(58) Field of Search ........................ 188/220.1, 223.6, 188/234, 235, 236, 242, 247, 248, 250 R, 251 R, 253

(56) References Cited

U.S. PATENT DOCUMENTS

| | | | | |
|---|---|---|---|---|
| 785,303 | * | 3/1905 | Gallagher | 188/247 |
| 785,355 | * | 3/1905 | Gallagher | 188/247 |
| 817,541 | * | 4/1906 | Armbrust | 188/241 |
| 1,892,816 | * | 1/1933 | Thornburgh | 188/245 |
| 2,266,984 | * | 12/1941 | Moore | 188/242 |
| 3,235,952 | * | 2/1966 | Arrasmith | 188/242 |
| 4,000,792 | * | 1/1977 | Guldin | 188/242 |
| 5,275,263 | * | 1/1994 | Mezger | 188/251 A |
| 5,407,031 | * | 4/1995 | Christie | 188/29 |
| 5,429,215 | * | 7/1995 | King | 188/250 C |
| 5,890,566 | * | 4/1999 | Yoshida et al. | 188/73.1 |

FOREIGN PATENT DOCUMENTS

| | | | | |
|---|---|---|---|---|
| 0071762 | * | 5/1982 | (DE) | 188/242 |
| 2087995 | * | 6/1982 | (GB) | 188/242 |
| 57177437 | * | 11/1982 | (JP) | 188/242 |

* cited by examiner

*Primary Examiner*—Robert J. Oberleitner
*Assistant Examiner*—Xuan Lan Nguyen
(74) *Attorney, Agent, or Firm*—James Ray & Associates

(57) ABSTRACT

A brake shoe mounting system for railway vehicles includes a composition type brake shoe having a recessed center portion and two bracket-style backing plates integrally molded into the composition type brake shoe. There is one bracket style backing plate per each half of the brake shoe. Each bracket style backing plate further includes at least two projections extending outwardly from the convex surface of the composition brake shoe. The two projections extending outwardly are closely adjacent a first end of the brake shoe and at least one projection extends outwardly from the convex surface of the brake shoe closely adjacent the recessed center portion of the composition type brake shoe. The mounting system further includes a brakehead having a concave surface with a central projection for engaging the recessed center portion of the convex surface of the brake shoe. The brakehead includes a first recessed area closely adjacent a first end of the brakehead for receiving projections extending outwardly from the backing plate and a second recessed area closely adjacent the central projection for receiving the one projection extending outwardly from the backing plate. The mounting system also includes a device for securing the backing plate and brake shoe to the brakehead.

12 Claims, 4 Drawing Sheets

BRAKE SHOE MOUNTING SYSTEM

FIELD OF THE INVENTION

This invention relates, in general, to brake shoes and brakeheads for railway vehicles; i.e., railway cars, transit cars and locomotives. More particularly, this invention relates to a new and unique backing plate and brakehead system for railway brake shoes having improved mounting features for assembling such brake shoe on the brakehead without the use of keys or screws.

BACKGROUND OF THE INVENTION

Railway brake shoes are typically mounted on brake rigging of railway vehicles by means of a brake shoe key, which passes through a longitudinal slot in the brake shoe holder or "brakehead" of the brake rigging and concurrently through mounting holes of the brake shoe backing plate. Such holes are normally located in a central "keybridge" area of the brake shoe backing plate. The keybridge area of the backing plate is generally formed in such a way that it is adapted to protrude into or intersect with a longitudinal slot in the brakehead at or near the center of the brakehead's length.

A certain type of railroad transit vehicle utilizes brake shoes made of a solid processed wooden material and having a different mounting system. Such shoes are mounted to the brakehead by means of brass screws which project through the face of the brakehead and are embedded into the body of the brake shoe. Wooden shoes have been used on these vehicles because, heretofore, other types of composition brake shoes have caused excessive brake squeal when the brake was applied to the wheels of these vehicles. The noise tendency is related to the unique shape of the wheel and the suspension of the wheel, which is used primarily for the braking function and does not normally contact a rail surface during operation. The wooden type of brake shoe has been found most resistant to noise generation, and the existing mounting arrangement has been reliable for the wooden type of brake shoe, although it has several disadvantages. These include a time consuming assembly process which requires the use of power tools and reduction in useable thickness of the brake shoe in order to avoid contact between the screw and the wheel as the brake shoe wears.

While new composition materials have been developed which have acceptable noise characteristics, these types of material have mechanical properties different than wood, such that the screw mounting system is not as reliable as when used with wooden brake shoes. It also has been recognized that the depth of the screws require the brake shoe to be replaced while there is still significant thickness of material on the brake shoe, which could otherwise contribute to a longer useable life of the brake shoe. Therefore, an alternate design of the mounting system was desired.

SUMMARY OF THE INVENTION

The present invention provides a brake shoe mounting system for railway vehicles. This system includes a composition type brake shoe having a recessed center portion and two bracket-style backing plates integrally molded into the composition type brake shoe. There is one bracket style backing plate per each half of the brake shoe. Each bracket style backing plate further includes at least two projections extending outwardly from a convex surface of the composition type brake shoe. At least one projection extending outwardly is closely adjacent a first end of the composition brake shoe and at least one projection extending outwardly from the convex surface of the composition type brake shoe is closely adjacent the recessed center portion of the composition type brake shoe. The mounting system provided by the present invention further includes a modification to the brakehead having a concave surface with a central projection for engaging the recessed center portion of the convex surface of the brake shoe. The brakehead modification is comprised of a first recessed area closely adjacent a first end of the brakehead for receiving projections extending outwardly from the backing plate and a second recessed area closely adjacent the central projection for receiving the at least one projection extending outwardly from the backing plate. The mounting system also includes a securing means for securing the backing plate that is integrally molded to the brake shoe to the brakehead.

OBJECTS OF THE INVENTION

Accordingly, it is a primary object of this invention to provide a new and improved brake shoe for railway vehicles having improved means for mounting the brake shoe on the brakehead.

Another primary object of this invention is to provide a new and improved backing plate for brake shoes on railway vehicles having improved means for properly assembling the brake shoe on the brakehead.

Another object of the present invention is to provide a mounting system which will permit increased usable thickness of the brake shoe compared to the presently used screw type mounting system.

It is still another object of the present invention to design a specially configured spring retainer to secure the brake shoe to the brakehead.

Yet another object of the invention is to integrally mold a bracket-style backing plate into the body of the brake shoe.

Still another object of this invention is to provide a new and unique system for assembling such brake shoe to the brakehead.

An even further object of this invention is to provide a unique mounting system which would allow continued and interchangeable use of the present wooden brake shoe type without modification.

These and other objects and advantages of this invention will become apparent after a full reading of the following detailed description, particularly, when read in conjunction with the attached drawings as described below and the appended claims.

Figure 1:
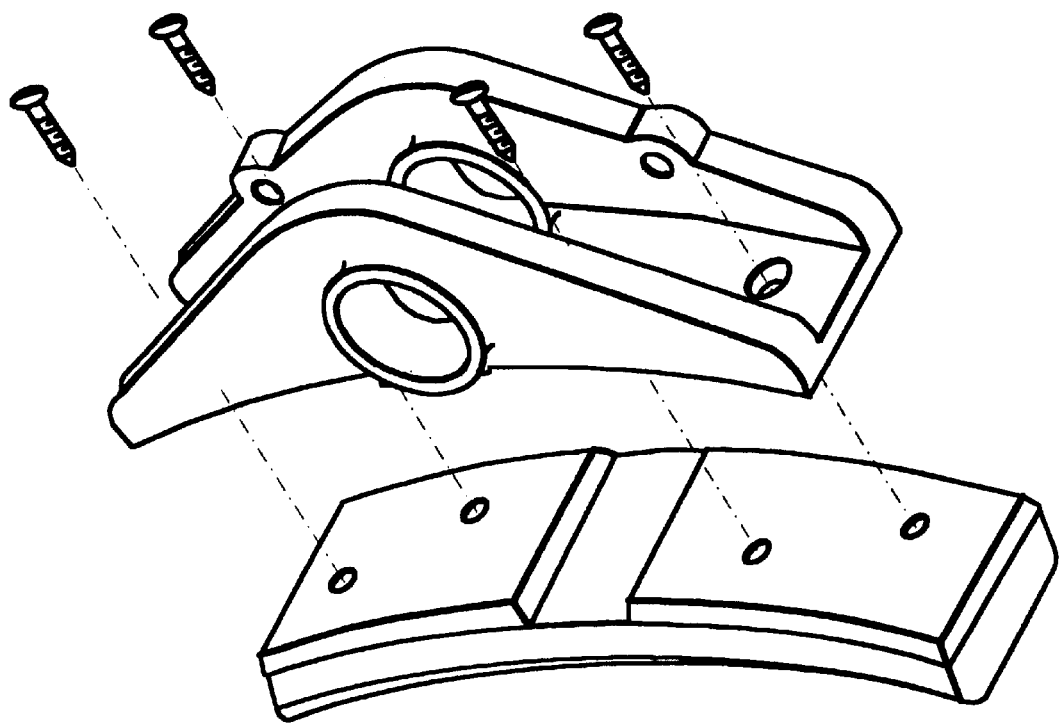
FIG. 1 is a partial perspective view of a prior art type brakehead and brake shoe.

BRIEF DESCRIPTION OF THE PRESENTLY PREFERRED AND ALTERNATE EMBODIMENTS OF THE INVENTION

Prior to proceeding with the more detailed description of the present invention it should be noted that, for the sake of clarity, identical components which have identical functions have been designated by identical reference numerals throughout the several views illustrated in the drawings.

Illustrated in FIG. 1 is a prior art type brakehead and brake shoe with backing plates as is commonly found on transit cars quipped with a wooden type brake shoe.

Reference is now made to FIGS. 2 through 8. Illustrated therein are the presently preferred embodiments of the instant invention. The invention comprises a backing plate 4, which is formed as two separate plates. These plates are integrally molded into a composition brake shoe 3. A spring retainer 2 is designed so that it provides a reliable method of assembling a molded brake shoe 3 and backing plate 4 to a brakehead 9 which has been modified to accept the new brake shoe/retainer system.

Figure 7:
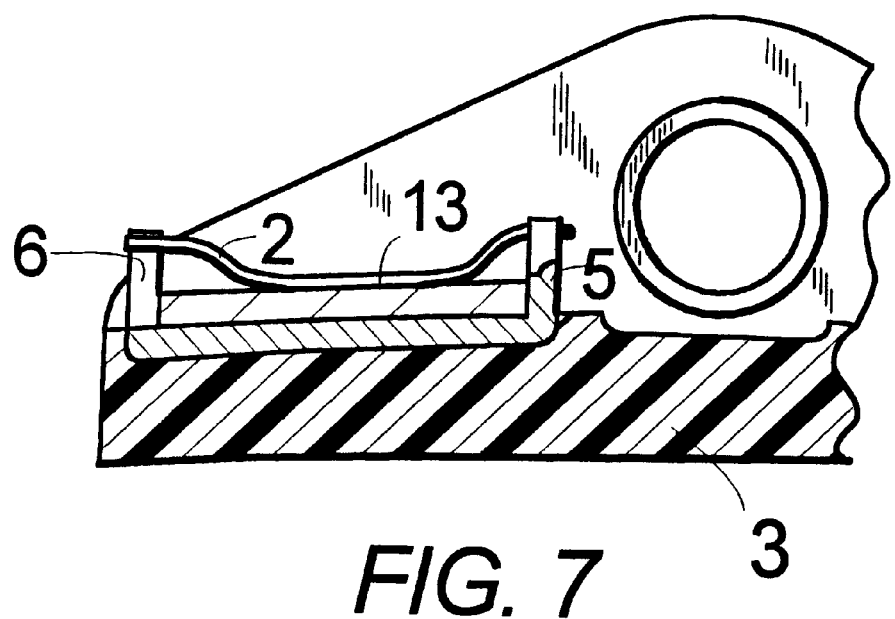
FIG. 7 is a cross sectional view of a brake shoe with the backing plate molded therein and mounted on a portion of the brakehead with the retainer spring in place.

The brakehead 9 is modified by machining both of the edges 11 and 12 so that the distance between these edges is maintained at a specific tolerance. The dimension and tolerance is fixed to allow a fit between the projections 5 and 6 of the brake shoe backing plate 4 and thereby restrict both lateral and longitudinal movement of the brake shoe 3 relative to the brakehead 9 while allowing the spring retainer clip 2 to be applied to the backing plate projections 5 and 6 in order to clamp the brake shoe 3 against the face or the concave surface 13 of the brakehead 9 as shown in FIGS. 2, 7 and 8.

Figure 2:
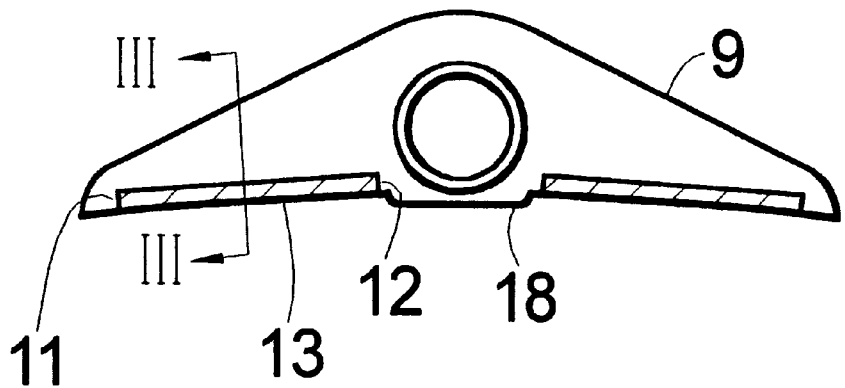
FIG. 2 is a longitudinal cross sectional view of a brakehead showing the modified area.
Figure 3:
FIG. 3 is a cross section view taken across the lines of III—III of FIG. 2.
Figure 4:
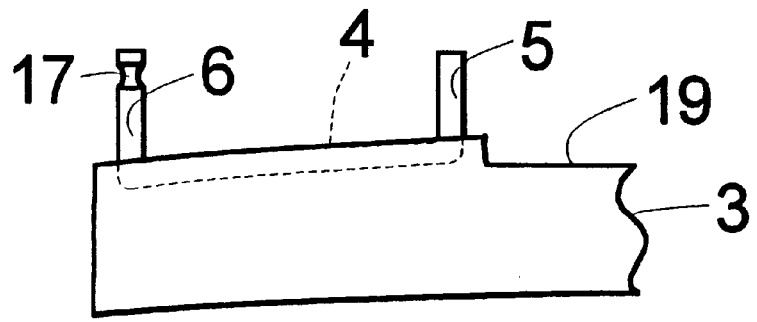
FIG. 4 is a cross sectional view of a portion of a brake shoe with a backing plate molded therein.
Figure 5:
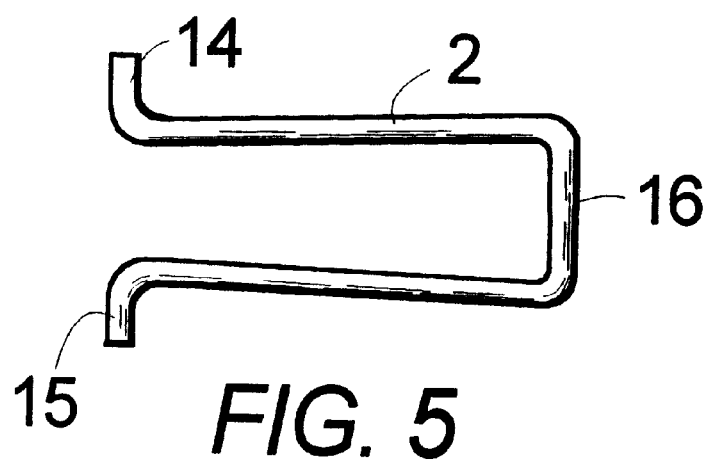
FIG. 5 is a top view of a spring retainer in one presently preferred embodiment of the invention.
Figure 6:
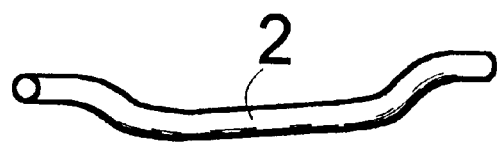
FIG. 6 is a side view of the spring retainer shown in FIG. 5.
Figure 8:
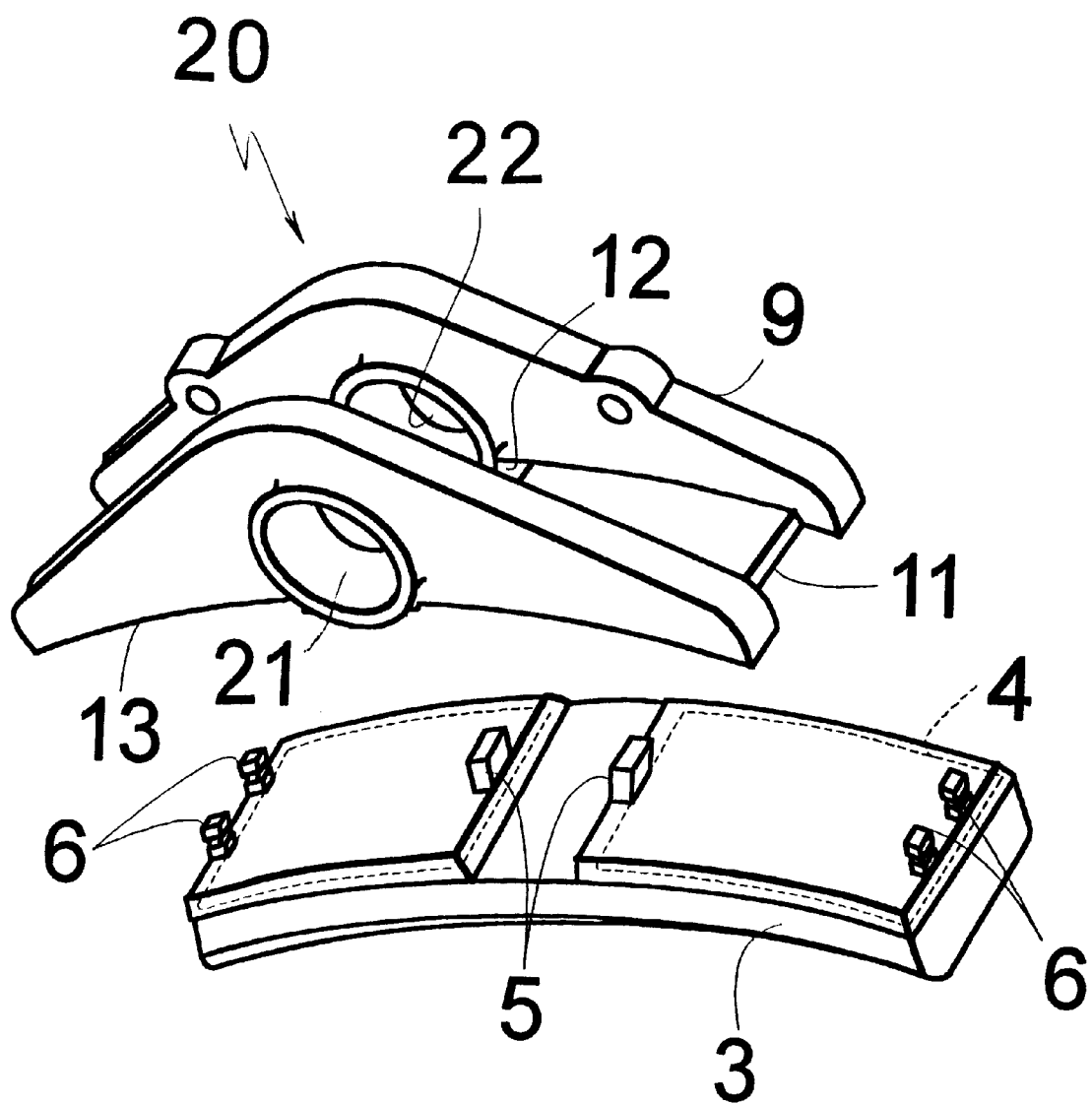
FIG. 8 is a partial perspective view of a brakehead and a brake shoe showing the presently preferred embodiments of the invention.

Assembly of the brake shoe 3 to the brakehead 9 is accomplished by positioning the convex surface of the brake shoe 3 such that it contacts the concave surface 13 of the brakehead 9 as shown in FIGS. 2 and 8. Brakehead 9 has a central projection 18 which mates with the center recessed portion 19 of brake shoe 3. The specially configured spring retainer clip 2 is applied by use of a compression tool (not shown), such that the flat central portion 16 of the spring retainer 2 overlaps projection tab 5 of the backing plate 4, and the end portions 14 and 15 of the spring retainer 2 interlock into notches 17 in projection tabs 6 (shown in FIG. 4) of the backing plate 4. Two spring retainers 2 are used to completely assemble the brake shoe 3 to the brakehead 9, each engaging the appropriate projection tab notches of one of the two backing plates 4 that are integrally molded within the brake shoe 3.

The application of the spring retainer 2, in the present invention can be accomplished in less time than that required for drilling pilot holes into the body of wooden or composition brake shoes. Further, the assembly of a brake shoe to the brakehead without the use of screws provides for an increased useable thickness of the brake shoe compared to brake shoes mounted by the screw mounting system. The use of two separate backing plates and spring retainers for each brake shoe provides increased reliability via redundancy. Since the spring retainer application is accomplished by means of a tool which is readily available in assembly shops, but not normally available in other environments, the brake shoe/brakehead assembly is less susceptible to tampering by unauthorized persons. The present invention also eliminates the need for power tools to mount the brake shoes to the brakehead.

The brakehead further includes a securing means, generally designated 20, for pivotably mounting such brakehead 9 on a brake beam (not shown). Such securing means 20 includes apertures 21 and 22 disposed on each side of the such brakehead 9 engageable with a rod (not shown) for securing such brakehead 9 to such brake beam.

The brakehead modification of the present invention can be made in such a manner as to allow the application of either composition brake shoes or wooden brake shoes by using the previous standard screw mounting system. The modification of the brakehead does not affect the screw holes that are present in the currently employed brakeheads. Such holes will remain but will not be used with the new brake shoes. They can be used; however, where necessary to mount wooden shoes.

While both the presently preferred and a number of alternative embodiments of the present invention have been described in detail above it is understood that various other adaptations and modifications of the present invention can be envisioned by those persons who are skilled in the relevant art of brake shoes and railway braking systems without departing from either the spirit of the invention or the scope of the appended claims.

What is claimed is:

1. A brake shoe mounting system for railway vehicles, said system comprising:

(a) a composition type brake shoe having a concave surface and a convex surface in a longitudinal direction, said convex surface having a recessed center portion;

(b) two bracket-style backing plates integrally molded into said composition type brake shoe closely adjacent said convex surface, one bracket style backing plate being mounted on each side of said recessed center portion of said brake shoe, each said bracket style backing plate including:

(i) at least two projections extending outwardly from said convex surface of said composition type brake shoe closely adjacent respective ends of said composition brake shoe, (ii) at least one projection extending outwardly from said convex surface of said composition type brake shoe closely adjacent respective edges of said recessed center portion of said composition type brake shoe;

(c) a brakehead having a concave surface with a central projection for engaging said recessed center portion of said convex surface of said brake shoe, said brakehead including:

(i) a first recessed area closely adjacent each end of said brakehead for receiving said at least two projections extending outwardly closely adjacent each end of said composition type brake shoe, (ii) a second recessed area closely adjacent each side of said central projection for receiving said at least one projection extending outwardly closely adjacent said respective edges of said recessed center portion of said composition type brake shoe; and (d) a securing means for securing said brake shoe with said two bracket style backing plates molded therein to said brakehead, said securing means includes a pair of spring retainers.

2. A brake shoe mounting system for railway vehicles, according to claim 1, wherein each of said at least two projections of said backing plates extending outwardly from said convex surface of said composition type brake shoe are provided with notches for receiving a respective one of said pair of spring retainers.

3. A brake shoe mounting system for railway vehicles, according to claim 2, wherein each one of said spring retainers has a flat central portion which overlaps a respective one of said at least one projection of said backing plate extending outwardly from said convex surface of said composition type brake shoe and end portions which interlock into said notches on said at least two projections of said backing plate extending outwardly from said convex surface of said composition type brake shoe.

4. A brake shoe mounting system for railway vehicles, according to claim 1, wherein at least one of said first and said second recessed areas of each half of said brakehead are provided with a first predetermined tolerance so that a portion of said concave surface of said brakehead between said recessed areas is maintained at a first predetermined distance so as to fit snugly between said at least one and said at least two projections of said backing plate of said composition brake shoe.

5. A brake shoe mounting system for railway vehicles, according to claim 4, wherein said first predetermined tolerance is achieved by machining.

6. A brake shoe mounting system for railway vehicles, according to claim 1, wherein said first recessed area of said brakehead is at least one notch.

7. A brake shoe mounting system for railway vehicles, according to claim 6, wherein said first recessed area of said brakehead includes a pair of notches.

8. A brake shoe mounting system for railway vehicles, according to claim 6, wherein said at least one notch extends between side portions of said brakehead.

9. A brake shoe mounting system for railway vehicles, according to claim 1, wherein second recessed area is a slot.

10. A brake shoe mounting system for railway vehicles, according to claim 8, wherein second recessed area is a slot.

11. A brake shoe mounting system for railway vehicles, according to claim 1, wherein said brakehead includes a means for pivotably mounting said brake shoe mounting system on a brake beam.

12. A brake shoe mounting system for railway vehicles, according to claim 1, wherein said means for pivotably mounting said brake shoe system on a brake beam includes apertures on each side of said brakehead for engaging a rod of such brake beam.

* * * * *